United States Patent
El-Barbari et al.

(10) Patent No.: US 8,599,586 B2
(45) Date of Patent: Dec. 3, 2013

(54) POWER INVERTER SYSTEM AND METHOD OF STARTING SAME AT HIGH DC VOLTAGE

(75) Inventors: Said Farouk Said El-Barbari, Freising (DE); Anthony William Galbraith, Wirtz, VA (US)

(73) Assignee: General Electric Company, Niskayuna, NY (US)

( * ) Notice: Subject to any disclaimer, the term of this patent is extended or adjusted under 35 U.S.C. 154(b) by 100 days.

(21) Appl. No.: 12/870,795

(22) Filed: Aug. 28, 2010

(65) Prior Publication Data

US 2012/0051101 A1   Mar. 1, 2012

(51) Int. Cl.
*H02M 1/36*   (2007.01)

(52) U.S. Cl.
USPC ............... 363/49; 363/95; 323/901; 323/906

(58) Field of Classification Search
USPC ............ 323/223, 266, 299, 901, 906; 363/49, 363/51, 43, 53, 55, 95
See application file for complete search history.

(56) References Cited

U.S. PATENT DOCUMENTS

| | | | | |
|---|---|---|---|---|
| 4,333,136 A | * | 6/1982 | Baker | 363/43 |
| 6,058,035 A | * | 5/2000 | Madenokouji et al. | 363/95 |
| 6,963,147 B2 | * | 11/2005 | Kurokami et al. | 307/154 |
| 7,710,752 B2 | | 5/2010 | West | |
| 2008/0094867 A1 | | 4/2008 | Muller et al. | |
| 2010/0124087 A1 | | 5/2010 | Falk | |

FOREIGN PATENT DOCUMENTS

DE   202006001063 U1   6/2006
EP      1039621 A2   3/2000

OTHER PUBLICATIONS

DE 20 2006 001 063 U1, English Abstract.

* cited by examiner

*Primary Examiner* — Adolf Berhane
*Assistant Examiner* — Yemane Mehari
(74) *Attorney, Agent, or Firm* — Paul J. DiConza

(57) ABSTRACT

A power inverter system includes a plurality of power semiconductor switching devices. Each switching device includes a corresponding gate turn off resistance configured to increase during starting up periods of the inverter system such that the open circuit voltage of a corresponding power source providing power to the power inverter system does not exceed the switching device blocking voltage ratings during the corresponding switching turn-off periods. The starting up period is the time required to bring the corresponding power source voltage from its open circuit voltage level to a predetermined voltage which constitutes a safe operating condition for the plurality of power semiconductor switching devices.

28 Claims, 5 Drawing Sheets

POWER INVERTER SYSTEM AND METHOD OF STARTING SAME AT HIGH DC VOLTAGE

BACKGROUND

This invention relates generally to the field of solar power generation and, more particularly, to methods and systems to allow for a high DC source voltage in a solar power inverter system.

Solar power generation is becoming a progressively larger source of energy throughout the world. Solar power generation systems typically include one or more photovoltaic arrays (PV arrays) having multiple interconnected solar cells that convert solar energy into DC power through the photovoltaic effect. In order to interface the output of the PV arrays to a utility grid, a power converter system is used to change the DC current and DC voltage output of the PV array into a 60/50 Hz AC current waveform that feeds power to the utility grid.

Various power converter systems exist for interfacing the DC output of a PV array (or other DC power source) with the AC grid. One implementation of a power converter system includes two stages, a boost converter stage and an inverter stage. The boost converter stage controls the flow of DC power from the PV array to a DC bus or DC link (hereinafter referred to as the "DC link"). The inverter stage converts the power supplied to the DC link into a suitable AC waveform that can be output to the AC grid.

Situations arise in which it is necessary to accommodate a PV array (or other DC power source) that has a high open-circuit voltage, such as an open-circuit voltage that is very close to the blocking voltage rating of the semiconductor devices employed in the power inverter system. E.g. array open circuit voltage is 1000 Vdc and the blocking voltage of the semiconductor devices is 1200 Vdc. Power inverter semiconductor devices, such as insulated gate bipolar transistors (IGBTs), are typically selected to accommodate the maximum power voltage of the PV array, not the open-circuit voltage of the PV array. The limiting factor in starting up at high voltage is the voltage overshoot at turn-off of the IGBTs.

In view of the foregoing, there is a need for a solar power inverter system and method of operation that allows for a high DC source voltage during start-up conditions. The inverter system should prevent the DC link voltage from reaching or exceeding the inverter system semiconductor device blocking voltage(s) during PV inverter start-up.

BRIEF DESCRIPTION

One embodiment of the present disclosure is directed to a power inverter system, comprising:
  a DC to AC inverter comprising a plurality of power semiconductor switching devices;
  a DC link coupling DC power to the inverter, the DC link comprising a DC link capacitor; and
  a controller configured to increase a gate turn off resistance for each of the power semiconductor switching devices only during starting up periods of the inverter system such that the DC link voltage does not exceed the power semiconductor switching device blocking voltage rating during the corresponding switching turn-off periods, wherein the starting up period is the time required to bring a corresponding DC power source voltage from an open circuit voltage to a predetermined voltage which constitutes a safe operating condition for the plurality of power semiconductor switching devices.

Another embodiment of the present disclosure is directed to a method of operating a power inverter system, the method comprising:
  providing an inverter comprising a plurality of power semiconductor switching devices, a DC link comprising a capacitor, and an inverter controller;
  coupling a DC voltage source to the inverter via the DC link capacitor; and
  subsequent to coupling the DC voltage source to the inverter, increasing a gate turn off resistance for each of the semiconductor power switching devices only during its corresponding starting up periods such that the DC link voltage does not exceed the respective power semiconductor switching device blocking voltage rating during the corresponding switching turn-off periods, wherein the starting up period is the time required to bring the DC source voltage from an open circuit voltage to a predetermined voltage which constitutes a safe operating condition for the plurality of power semiconductor switching devices.

According to yet another embodiment, a power inverter system comprises a plurality of power semiconductor switching devices, each switching device comprising a corresponding gate turn off resistance configured to increase during starting up periods of the inverter system such that the open circuit voltage of a corresponding power source providing power to the power inverter system does not exceed the switching device blocking voltage ratings during the corresponding switching turn-off periods, wherein the starting up period is the time required to bring the corresponding power source voltage from its open circuit voltage level to a predetermined voltage which constitutes a safe operating condition for the plurality of power semiconductor switching devices.

DRAWINGS

These and other features, aspects, and advantages of the present invention will become better understood when the following detailed description is read with reference to the accompanying drawing, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
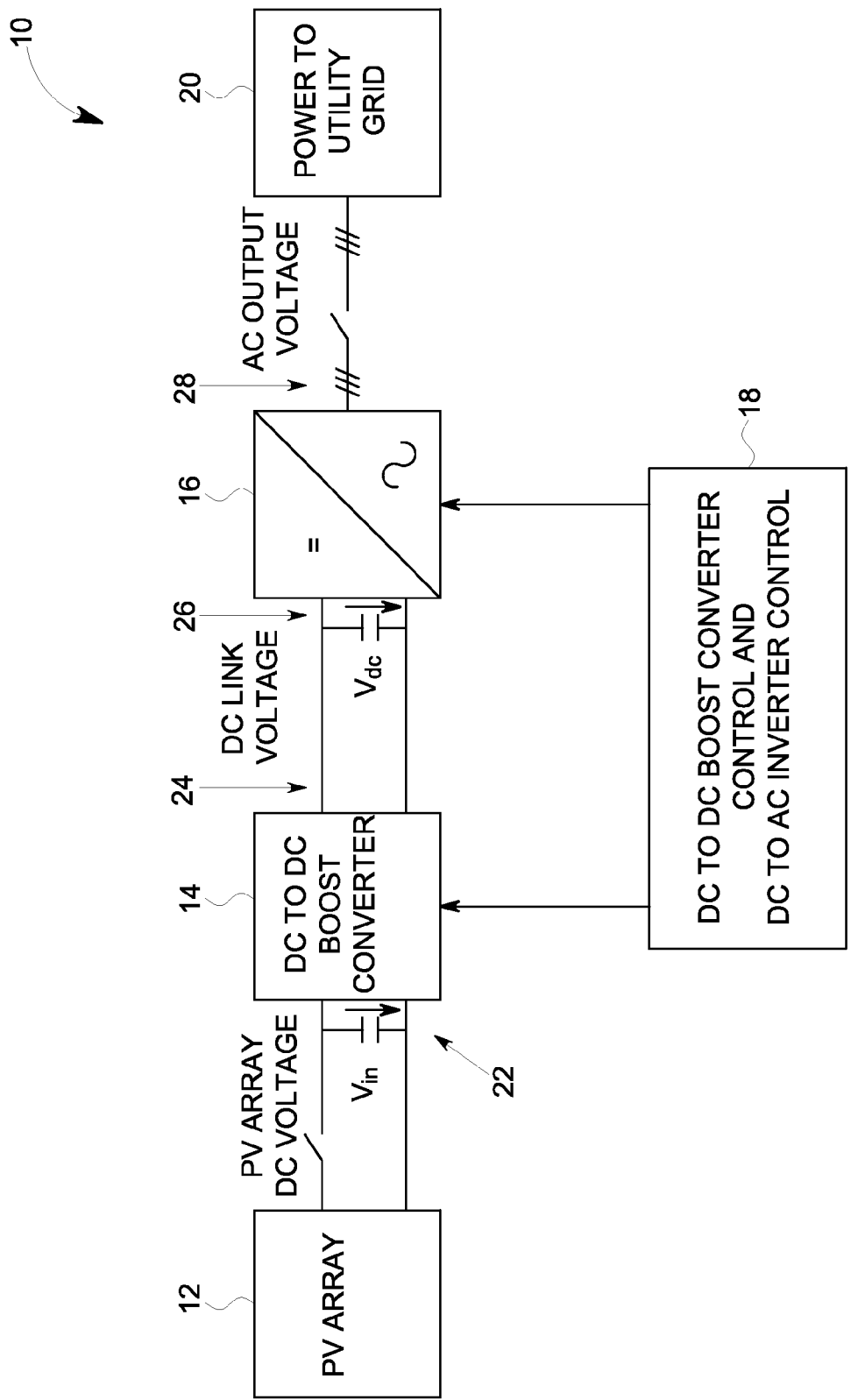
FIG. 1 is a block diagram illustrating a photovoltaic inverter system according to an exemplary embodiment of the present disclosure.

FIG. 1 depicts a block diagram of a two stage PV power inverter system 10 used to convert DC power 22 generated by a PV array 12 into AC power 28 suitable for feeding an AC power grid 20. The first stage of power inverter system 10 can include a DC to DC converter 14, such as a boost converter, that provides DC power 24 to a DC link 26. The DC link 26 couples the DC to DC converter 14 to an inverter 16 which operates as the second stage of the PV inverter system 10. Inverter 16 converts the DC power 24 on the DC link 26 to AC power 28 suitable for being supplied to an AC power grid 20. DC to DC converter 14 can be a part of or integral with inverter 16 or can be a separate stand alone structure from inverter 16. In addition, more than one converter 14 can be coupled to the same inverter 16 through one or more DC links.

PV inverter system 10 includes a control system 18 that is configured to control both the DC to DC boost converter 14 and the DC to AC inverter 16. For instance, control system 18 can be configured to regulate the output of the DC to DC converter 14 pursuant to a control method that adjusts the duty cycle (switching speed) of the switching devices (IGBTs or other power electronic devices) used in the DC to DC converter 14. Control system 18 can also be configured to regulate the output of inverter 16 by varying the modulation commands provided to inverter 16. The modulation commands control the pulse width modulation of the inverter 16 and can be used to vary the real and reactive output power of the inverter 16. Control system 18 can be independent from DC to DC boost converter 14 and DC to AC inverter 16 or may be integrated into one or both of the respective system stages 14, 16.

When PV inverter system 10 is operating in steady state conditions, control system 18 can regulate the DC link voltage 24 of the DC link 26 (and, correspondingly, the PV array source voltage of the PV array 12) by adjusting the AC output of inverter 16. For instance, control system 18 can regulate the DC link voltage 24 of the DC link 26 by controlling the AC current output of inverter 16. In steady state conditions, the inverter 16 is typically controlled to provide real power flow (i.e., the real part of the vector product of the inverter output AC voltage and the inverter output AC current) to the AC grid 20 that is equal to the power supplied to the DC link 26 by DC to DC converter 14. Varying the output AC current of the inverter 16 will result in a change to the output AC voltage of the inverter 16, based on the impedance of one or more output transformers and the utility grid 20. Adjusting the output AC voltage of the inverter 16 will correspondingly induce a change in the DC link voltage 24 of the DC link 26.

In situations in which it is necessary to accommodate a PV array 12 (or other DC power source) having a high open-circuit voltage, it is desirable to maintain the DC link voltage 24 less than the open-circuit voltage of the PV array 12. By maintaining the DC link voltage 24 less than the open-circuit voltage of the PV array 12, the PV array source voltage provided by the PV array 12 to the PV inverter system 10 can also be maintained less than the open-circuit voltage of the PV array 12, such as at the maximum power voltage of the PV array 12. In steady-state conditions, the control system 18 can regulate the DC link voltage 24 to be less than the open-circuit voltage of the PV array 12 by controlling the output of inverter 16. Starting up a PV inverter system when the open circuit voltage of the connected PV array is very close to the blocking voltage rating of the PV inverter semiconductor power devices, e.g. array open circuit voltage is 1000 Vdc and the blocking voltage of the semiconductor devices is 1200 Vdc, can however be problematic due to DC link voltage overshoot.

Figure 2:
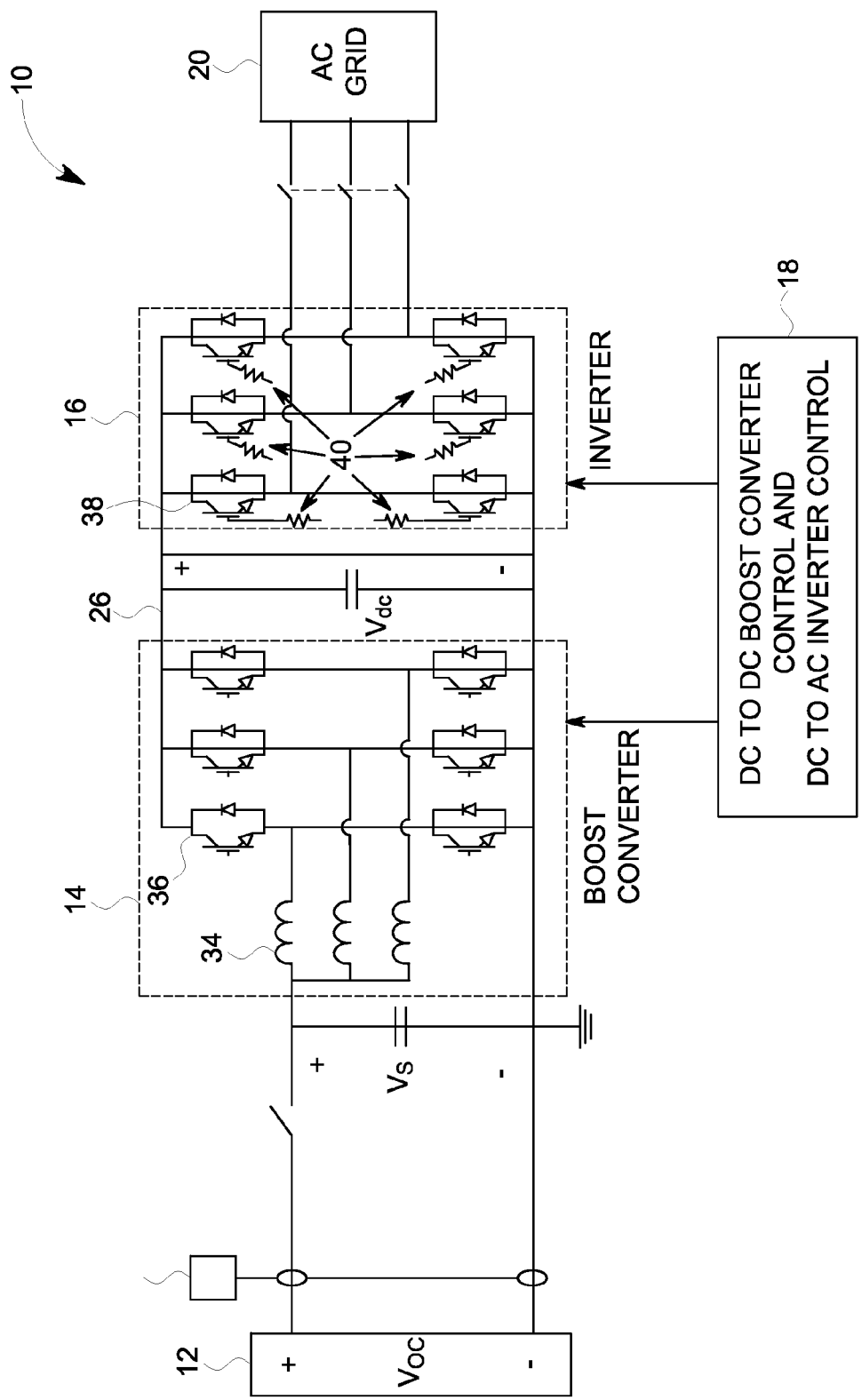
FIG. 2 illustrates a more detailed view of the PV inverter system depicted in FIG. 1.

FIG. 2 illustrates the PV inverter system 10 depicted in FIG. 1 modified with power semiconductor device 38 gate current limiting resistors 40. A limiting factor when starting up PV inverter system 10 is the DC link voltage overshoot at turn-off of the semiconductor power devices 38 that may comprise, for example, insulated gate bipolar transistors (IGBT)s. The DC link 26 voltage overshoot is generally represented by Vdc_overshoot=L*di/dt. The DC link voltage overshoot therefore is actually not dependent on the current magnitude, but on the current growth rate and the inductance in the commutation path. This voltage overshoot is only an issue at turning off the IGBT devices 38. Turning on the IGBT devices 38 does not present voltage overshoot issues.

The present inventors alone recognized that operating a PV inverter system, such as PV inverter system 10 depicted in FIG. 1, when the open circuit voltage of the connected PV array 12 is very close to the inverter semiconductor power device 38 blocking voltage rating, e.g. array open circuit voltage is 1000 Vdc and the semiconductor power device 38 blocking voltage rating is 1200 Vdc, is possible if the semiconductor power device currents are turned-off at a very low di/dt rate via large gate resistors 40 such as depicted in FIG. 2. The present inventors further recognized that operating the semiconductor power devices 38 in combination with large gate resistance 40 advantageously provides the desired low di/dt rate, but at an undesirable level of power device 38 operating efficiency; and that the foregoing undesirable losses can be reduced through a reduction of current and switching frequency during this operating mode that lasts for only a very short period of time for a PV array 12.

Figure 5:
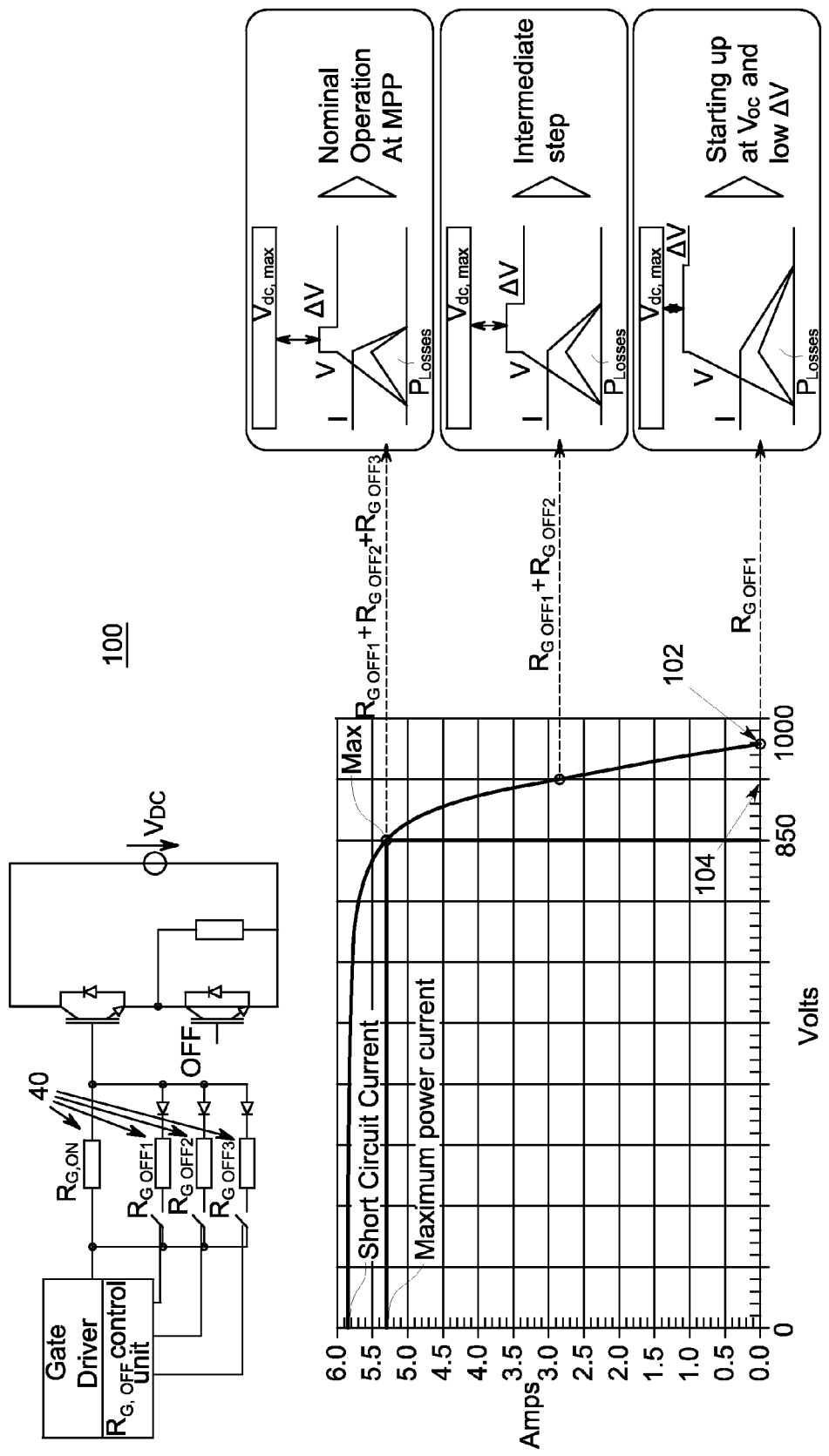
FIG. 5 illustrates a voltage clamping gate control system according to one embodiment.

According to one embodiment, the large value gate resistor(s) 40 are switched back to a smaller nominal resistance value when the PV array voltage reaches its maximum power point (MPP) voltage, which is about 20% lower than the open circuit voltage of the PV array 12. According to another embodiment, the gate resistor(s) 40 comprise variable resistance devices that linearly or non-linearly reduce the value of semiconductor power device gate resistance as the PV array voltage continues to drop in value approaching MPP voltage. FIG. 5, for example, illustrates a voltage clamping gate control architecture 100 that operates to reduce the switching device gate resistances 40 in a stepwise fashion during start-up conditions as the gate voltage reduces from an initial open circuit voltage 102 to the MPP voltage 104 according to one embodiment.

Although FIG. 2 illustrates a three-phase AC output for inverter 16, those of ordinary skill in the art, using the disclosures provided herein, should readily understand that inverter 16 can similarly provide a single-phase AC output or other multi-phase AC output as desired without deviating from the scope of the present invention. Inverter 16 uses one or more inverter bridge circuits that include power devices 38, such as IGBTs and diodes that are used to convert the DC power on DC link 26 into a suitable AC waveform. For instance, in certain embodiments, inverter 16 uses pulse-width-modulation (PWM) to synthesize an output AC voltage at the AC grid frequency. The output of inverter 16 can be controlled by providing gate timing commands to the IGBTs 38 of the inverter bridge circuits of inverter 16 according to well known PWM control techniques. The output AC current flowing from inverter 16 has components at the PWM chopping frequency and the grid frequency.

PV inverter system 10 may also include a PV array voltage sensor 42. PV array voltage sensor 42 monitors the voltage of the PV array 12 and provides feedback signals to control system 18. The control system 18 can make adjustments to the semiconductor power device 38 gate resistance 40 or other operating parameters of PV inverter system 10, e.g. semiconductor power device 38 switching frequency, based on the PV array voltage detected by PV array voltage sensor 42.

Figure 3:
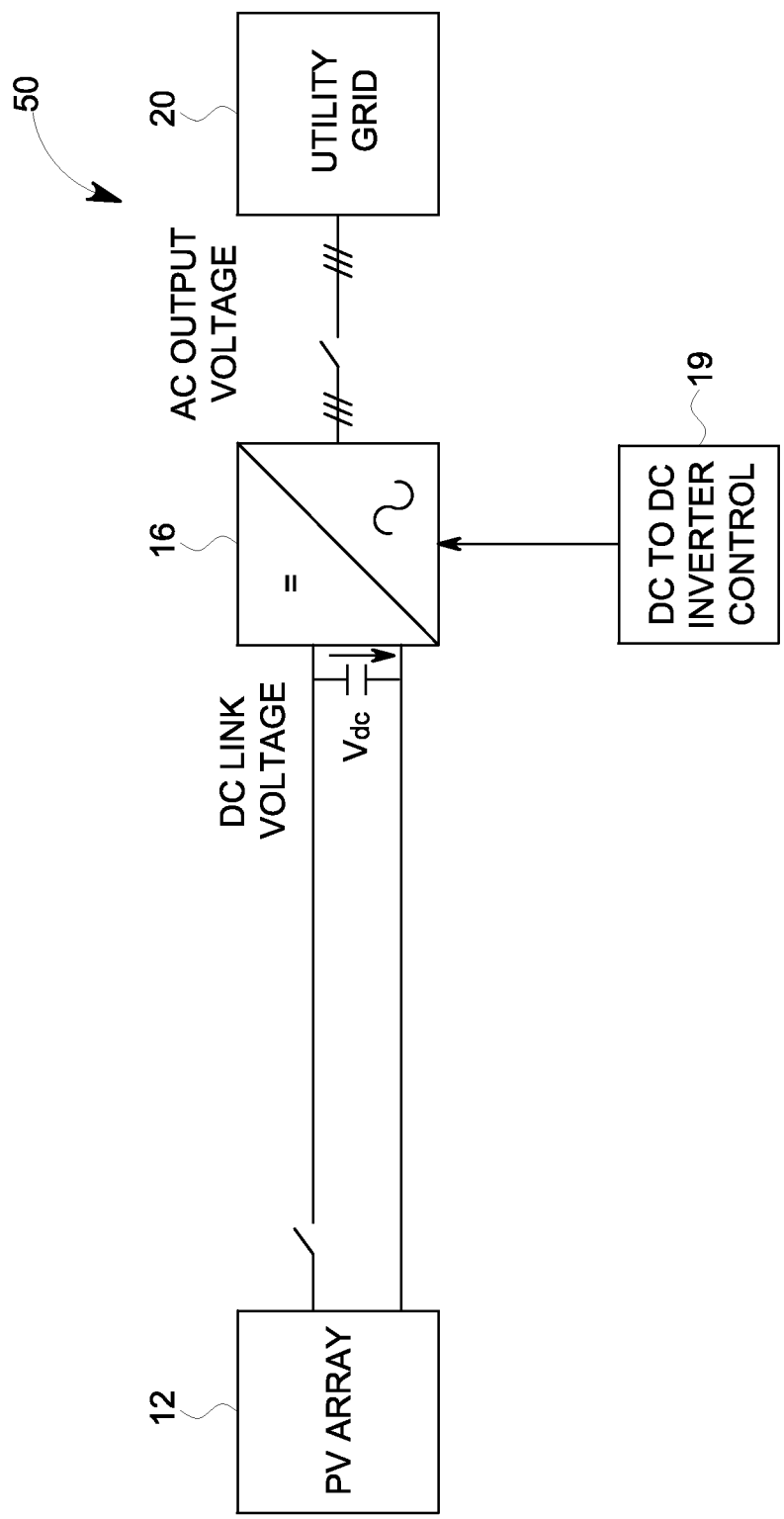
FIG. 3 is a block diagram illustrating a PV inverter system according to another embodiment.

FIG. 3 is a simplified block diagram illustrating a PV inverter system 50 according to another embodiment. PV inverter system 50 is similar to PV inverter system 10, except PV inverter system 50 does not employ a DC-DC converter such as boost converter 14 described herein with reference to FIGS. 1 and 2. PV inverter system 50 can be seen to include a DC to AC inverter control unit 19. According to one embodiment, inverter control unit 19 is configured to control the switching frequency of the inverter semiconductor power devices 38 and to also control the gate resistance value for each semiconductor power device 38. According to one aspect, the switching frequency is reduced below its normal operating value and the gate resistance is increased above its normal operating value when the PV array 12 open circuit voltage is very close to the semiconductor power device blocking voltage rating, e.g. array open circuit voltage is 1000 Vdc and the blocking voltage of the semiconductor power devices are 1200 Vdc. According to one embodiment, when the voltage generated by the PV array 12 reaches the MPP voltage, which is about 20% lower than the open circuit voltage of the PV array 12, the gate turn off resistor 40 employed during semiconductor power device 38 turn-off is switched back to a smaller value via control unit 19. According to another embodiment, one or more gate resistors 40 comprise a variable resistance device that reduces in value in response to signals received from control unit 19 as the PV array voltage output reduces in value.

Figure 4:
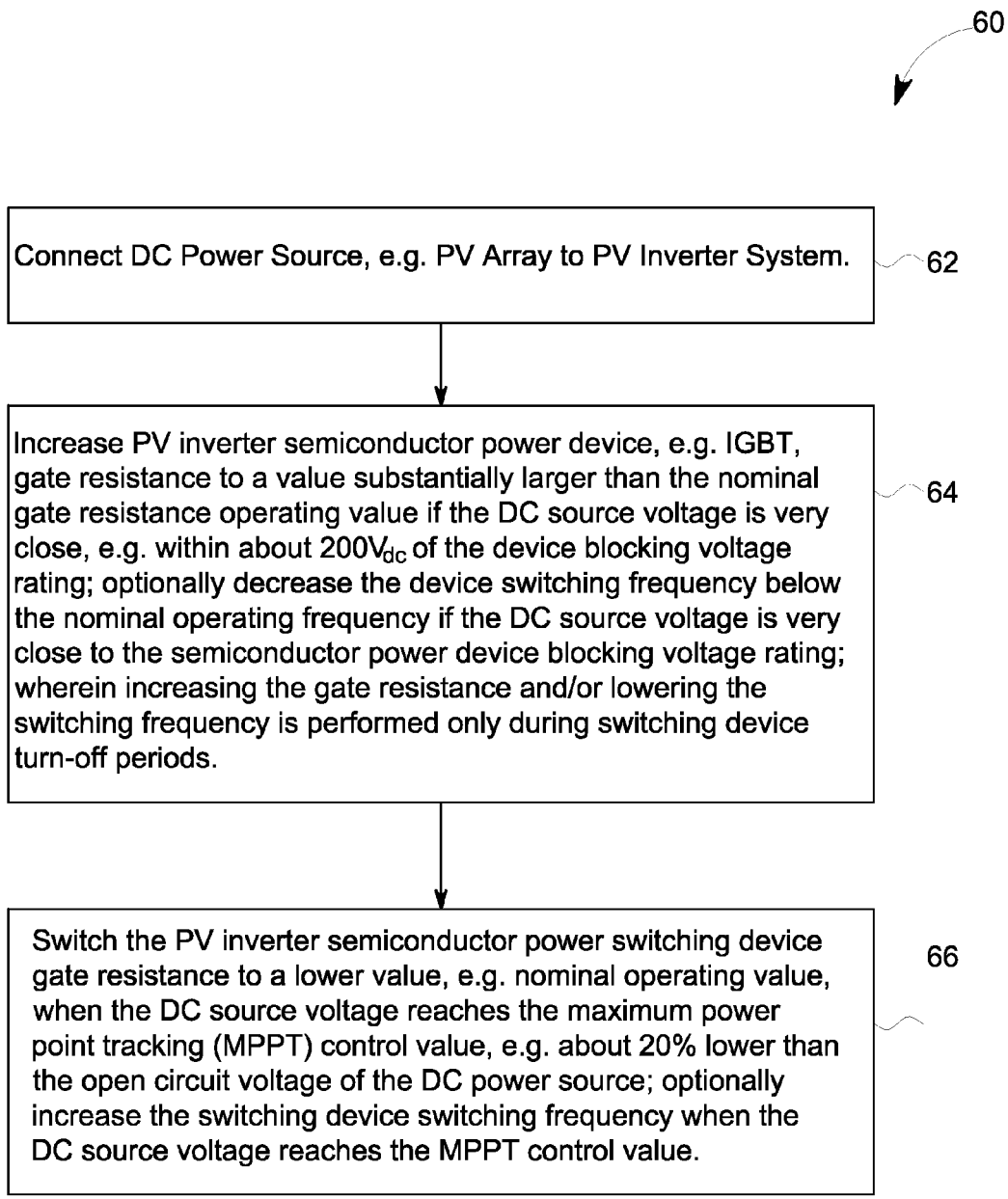
FIG. 4 is a flow diagram illustrating a method of operating the PV systems depicted in FIGS. 1-3 according to one embodiment.

FIG. 4 is a flow diagram illustrating a starting procedure 60 for the power converter systems 1, 50 according to one embodiment. Starting procedure 60 advantageously avoids any requirements for additional hardware necessary to pull down the voltage of the PV array 12 during start-up conditions. Starting procedure 60 further advantageously negates the necessity for using semiconductor power devices with higher rated blocking voltages, e.g. 1700V IGBTs, that reduce the efficiency and increase the system cost.

With continued reference to FIG. 4, starting procedure 60 commences by connecting the DC voltage source, e.g. PV array 12, to the PV inverter system 10, 50 as represented in step 62. The DC link voltage is preferably less than the open-circuit voltage Voc of PV array 12. According to one embodiment, the controller 18, 19 can operate the DC link at a first DC link voltage by controlling the AC output of inverter 16. PV array voltage sensor(s) 42 can be used to determine if PV array 12 is operating at an open-circuit voltage or other voltage.

Subsequent to coupling the PV array 12 to PV inverter system 10, 50, controller 18, 19 functions to quickly increase the gate turn off resistance 40 of each semiconductor power device, e.g. IGBTs, during starting up period, to a value that is larger than its nominal operating value if the monitored PV array voltage is very close to the semiconductor power device blocking voltage rating, as represented in step 64. According to one embodiment, the semiconductor power device switching frequency during the respective starting up period is also reduced to a value that is lower than its nominal operating value if the monitored PV array voltage is very close to the semiconductor power device blocking voltage rating.

Upon reaching the PV array MPP tracking voltage which is about 20% lower than the open circuit voltage of the PV array, controller 18, 19 operates to switch the corresponding turn off gate resistance(s) 40 back to a smaller nominal operating value according to one embodiment, as represented in step 66. According to one embodiment, controller 18, 19 tracks the PV array voltage to linearly or non-linearly reduce the corresponding gate resistance(s) 40 as the PV array voltage continues to reduce in value approaching MPP voltage.

2. Those skilled in the art will readily appreciate that semiconductor power switching device gate resistance(s) and switching frequencies will depend upon the particular application, system architecture, and semiconductor power switching device(s) employed in the power inverter system. The switching characteristics and gate resistance can be accomplished with or without the use of algorithmic software, depending upon the particular application. Algorithmic software, if employed, would reside within the controller 18, 19 according to one embodiment. According to one embodiment, the controller 18, 19 is configured to change the gate turn-off resistance for each power semiconductor switching device 38 at zero vector instance of the SVM (Space vector modulator). Zero vector as used herein is defined as the switching configuration of the power semiconductor devices 38 in a DC to AC inverter 16 that provides zero voltage at the inverter output. (e.g. a positive zero vector in a three-phase two-level DC/AC inverter occurs when all upper IGBTs are turned on and lower IGBTs are turned off. A negative zero vector will happen when all upper IGBTs are turned off and lower IGBTs are turned on). According to another embodiment, the controller 18, 19 is further configured to increase the gate turn off resistance during a zero/low voltage ride through (ZVRT/LVRT) event of the DC to AC inverter 16.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power inverter system, comprising:
   a DC to AC inverter comprising a plurality of power semiconductor switching devices;
   a DC link selectively coupling DC power to the inverter; and
   a controller configured to increase a gate turn off resistance for each of the power semiconductor switching devices during starting up periods of the inverter system such that the DC link voltage does not exceed the power semiconductor switching device blocking voltage ratings during the corresponding switching turn-off periods, wherein the starting up period is the time required to bring a corresponding DC power source voltage from an open circuit voltage to a predetermined voltage which constitutes a safe operating condition for the plurality of power semiconductor switching devices.

2. The power inverter system of claim 1, further comprising a boost converter for receiving the DC power source voltage and for providing DC power to the DC link.

3. The power inverter system according to claim 1, wherein the predetermined voltage comprises the DC power source maximum power point voltage.

4. The power inverter system according to claim 1, further comprising a photovoltaic array configured to generate the DC power.

5. The power inverter system according to claim 1, wherein the controller is further configured to increase the gate turn off resistance only when the DC link voltage is within a predefined minimum and maximum voltage value based on the blocking voltage rating of the power semiconductor switching devices.

6. The power inverter system according to claim 1, wherein the power semiconductor switching devices comprise insulated gate bipolar transistors.

7. The power inverter system according to claim 1, wherein the controller is further configured to decrease the switching frequency of the DC to AC inverter during starting up periods of the power inverter system.

8. The power inverter system according to claim 7, wherein the controller is further configured to increase the switching frequency of the DC to AC inverter when the DC link voltage is less than the predetermined voltage.

9. The power inverter system according to claim 8, wherein the predetermined voltage comprises the DC power source maximum power point voltage.

10. The power inverter system according to claim 1, wherein the controller is further configured to increase the gate turn off resistance of the power semiconductor switching devices when the DC link voltage is greater than the maximum power point voltage of the DC power source.

11. The power inverter system according to claim 1, wherein the controller is further configured to control the gate turn-off resistance for each power semiconductor switching device in a stepwise or non-stepwise fashion based upon the DC power source voltage level.

12. The power inverter system according to claim 1, wherein the controller is further configured to change the gate turn-off resistance for each power semiconductor switching device at zero vector instance of a corresponding space vector modulator, wherein zero vector is defined as the switching configuration of the power semiconductor devices in a DC to AC inverter that provides zero voltage at the inverter output.

13. The power inverter system according to claim 1, wherein the controller is further configured to increase the gate turn off resistance during a zero/low voltage ride through (ZVRT/LVRT) event of the DC to AC inverter.

14. A method of operating a power inverter system, the method comprising:
   providing an inverter controller and an inverter comprising a plurality of power semiconductor switching devices;
   connecting a DC voltage source to the inverter; and
   subsequent to connecting the DC voltage source to the inverter, increasing a gate turn off resistance for each of the semiconductor power switching devices during a corresponding inverter starting up period such that the source voltage does not exceed any power semiconductor switching device blocking voltage rating during the corresponding power semiconductor switching turn-off periods, wherein the starting up period is the time required to bring the DC source voltage from an open circuit voltage to a predetermined voltage which constitutes a safe operating condition for the plurality of power semiconductor switching devices.

15. The method according to claim 14, wherein the predetermined voltage comprises the DC power source maximum power point voltage.

16. The method according to claim 14, wherein the DC voltage source comprises a photovoltaic array.

17. The method according to claim 14, wherein the plurality of power semiconductor switching devices comprises insulated gate bipolar transistors.

18. The method according to claim 14, further comprising subsequent to connecting the DC voltage source to the inverter, increasing a gate turn off resistance for each of the semiconductor power switching devices only when the DC source voltage is higher than an inverter maximum dc link voltage rating such that the DC link voltage does not exceed the respective power semiconductor switching device blocking voltage rating during the corresponding switching turn-off periods.

19. The method according to claim 14, further comprising subsequent to connecting the DC voltage source to the inverter, decreasing the switching frequency for each of the semiconductor power switching devices during its corresponding starting up period such that the source voltage does not exceed the respective power semiconductor switching device blocking voltage rating during the corresponding switching turn-off periods.

20. A power inverter system comprising a plurality of power semiconductor switching devices, each switching device comprising a corresponding gate turn off resistance configured to increase during starting up periods of the inverter system such that the open circuit voltage of a corresponding power source providing power to the power inverter system does not exceed the switching device blocking voltage ratings during the corresponding switching turn-off periods, wherein the starting up period is the time required to bring the corresponding power source voltage from its open circuit voltage level to a predetermined voltage which constitutes a safe operating condition for the plurality of power semiconductor switching devices.

21. The power inverter system according to claim 20, wherein the predetermined voltage comprises the DC power source maximum power point voltage.

22. The power inverter system according to claim 20, wherein the power source comprises a photovoltaic array.

23. The power inverter system according to claim 20, wherein each gate turn off resistance is further configured to increase only when a corresponding inverter DC link voltage is within a predefined minimum and maximum voltage value based on the blocking voltage rating of the power semiconductor switching devices.

24. The power inverter system according to claim 20, wherein the plurality of power semiconductor switching devices comprises insulated gate bipolar transistors.

25. The power inverter system according to claim 20, wherein each power semiconductor switching device is configured to operate at a decreased switching frequency during its switching turn-off periods when the power source voltage is greater than the maximum power point voltage.

26. The power inverter system according to claim 20, wherein each power semiconductor switching device is further configured to operate at an increasing switching frequency during its switching turn-off periods as the power source voltage drops to or less than the maximum power point voltage.

27. The power inverter system according to claim 20, wherein each power semiconductor switching device gate turn off resistance is further configured to decrease from its increased value as the power source voltage drops to or less than the maximum power point voltage.

28. The power inverter system according to claim 20, wherein each power semiconductor switching device gate turn off resistance is further configured to change in a stepwise or non-stepwise fashion based upon the power source voltage level.

* * * * *